United States Patent [19]
Bartholomew

[11] Patent Number: 5,716,079
[45] Date of Patent: Feb. 10, 1998

[54] HOSE ASSEMBLY HAVING A DISTORTION LIMITING WALL FOR CREATING A DYNAMIC SEAL

[75] Inventor: Donald D. Bartholomew, Mt. Clemens, Mich.

[73] Assignee: Proprietary Technology, Inc., Bloomfield Hills, Mich.

[21] Appl. No.: 669,333

[22] PCT Filed: Jan. 24, 1994

[86] PCT No.: PCT/US94/01259
§ 371 Date: Jun. 24, 1996
§ 102(e) Date: Jun. 24, 1996

[87] PCT Pub. No.: WO95/20122
PCT Pub. Date: Jul. 27, 1995

[51] Int. Cl.⁶ .................................................. F16L 33/18
[52] U.S. Cl. .................. 285/247; 285/354; 285/379; 285/238
[58] Field of Search ................................. 285/240, 247, 285/354, 356, 379, 238

[56] References Cited

U.S. PATENT DOCUMENTS

| | | |
|---|---|---|
| 683,342 | 9/1901 | Sherman . |
| 1,138,946 | 5/1915 | Elliott . |
| 1,160,944 | 11/1915 | Muller . |
| 1,936,552 | 11/1933 | Goss . |
| 2,458,817 | 1/1949 | Wolfram ............... 285/354 X |
| 3,396,995 | 8/1968 | Burnside ............... 285/354 X |
| 4,030,778 | 6/1977 | Kaut, Jr. . |

Primary Examiner—Terry Lee Melius
Assistant Examiner—Heather Shackelford
Attorney, Agent, or Firm—Harness, Dickey & Pierce

[57] ABSTRACT

The present invention hose assembly (10) having a distortion limiting wall for creating a dynamic seal comprises a seal (14), a male hose subassembly (12) and a female hose subassembly (16). The seal (14) is concentrically mounted within the female hose subassembly (16) against a radially flanged segment (92) and an extension segment (94) of a female ferrule (74) with a lip (46) of a male ferrule (22) compressing against the seal (14) when the female and male hose subassemblies (16 and 12) are connected together.

11 Claims, 2 Drawing Sheets

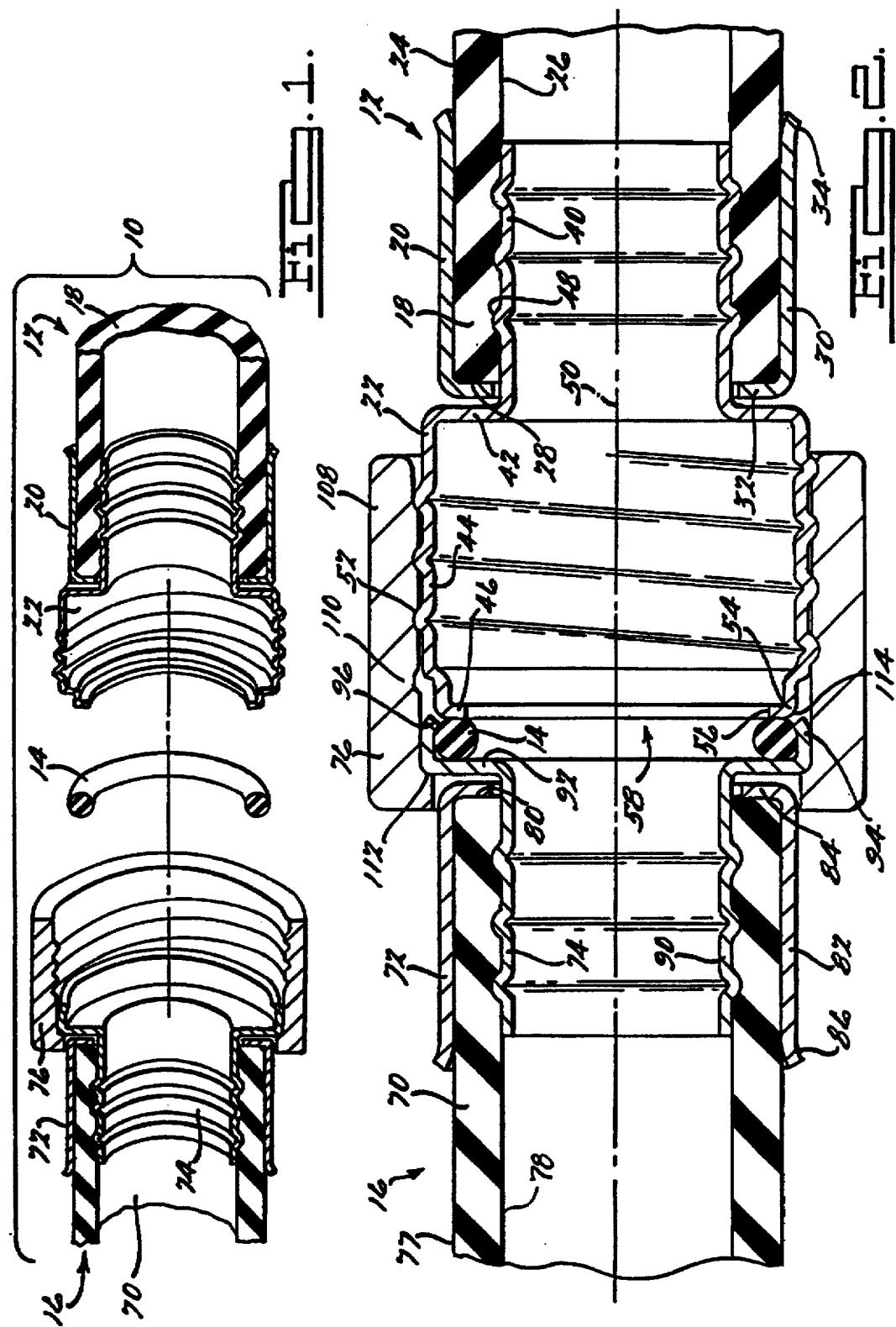

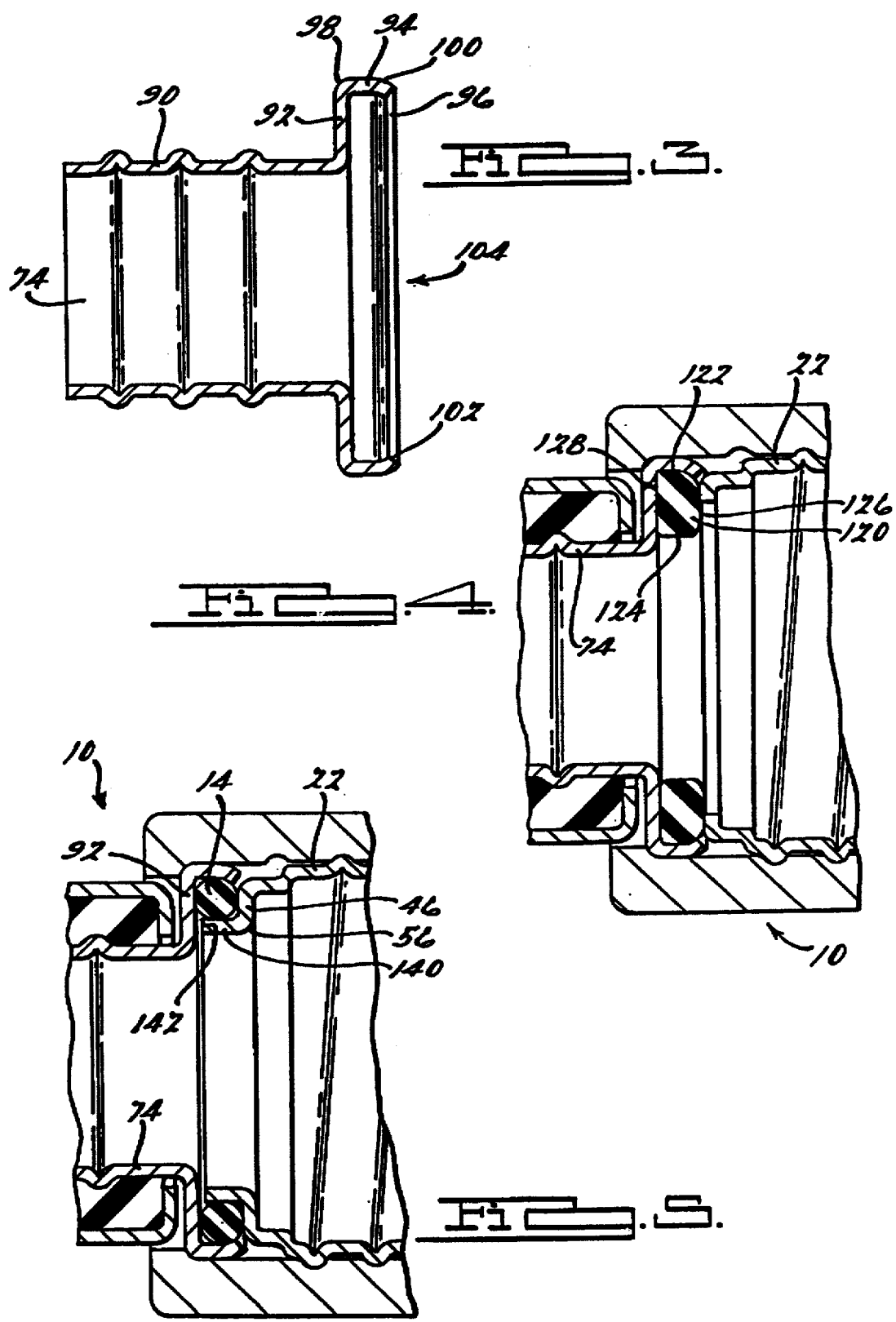

HOSE ASSEMBLY HAVING A DISTORTION LIMITING WALL FOR CREATING A DYNAMIC SEAL

BACKGROUND OF THE INVENTION

This invention relates generally to a hose assembly and specifically to connection elements used within a hose assembly having a seal therebetween.

In hose assemblies, it is common to employ a male and female hose subassembly each having threaded connection portions and a seal therebetween. Many such conventional male hose subassemblies have a male ferrule, partially extending within a first tubular member, and an outer casing which traps the tubular member therebetween. Similarly, conventional female hose subassemblies have a female ferrule, which partially extends within a second tubular member, and a congruent outer casing. The female hose subassemblies also have provisions for an internally threaded nut which operably secures an externally threaded portion of the male ferrule to the female hose subassemblies. Traditionally, a flat washer-type annular seal is juxtaposed between an end of the male ferrule and a simple outwardly formed radial flange of the female ferrule. Such a construction is shown in the "Bartholomew Manual on Tubing, Piping and Connector Systems", page 8 (1992), which was authored by the inventor of the present invention and is incorporated by reference herewithin. This washer-style seal, in combination with the aforementioned traditional ferrule configurations, is known as a compression seal.

Typically a compression seal is allowed to distort and radially move under load since only a pair of walls, the radial flange of the female ferrule and the adjacent end of the male ferrule, act to retard movement of the seal. Over time such a compression seal typically takes a permanent set due to cold flow of the elastomeric material and subsequent breakage of the polymeric molecular chains after continuous tightening together of the male and female hose subassemblies. Thus, when compression seals are subjected to extended use and over-torquing, their sealing ability tends to significantly degrade.

SUMMARY OF THE INVENTION

In accordance with the present invention, the preferred embodiment of a new and useful hose assembly having a distortion limiting wall for creating a dynamic seal comprises a seal, a male hose subassembly and a female hose subassembly. The male hose subassembly has a first tubular member with a first outer casing externally surrounding a distal end thereof. The male hose subassembly further has a male ferrule with an insertion portion protruding partially therein concentric and congruent with the first outer casing such that the first tubular member is securely trapped therebetween. The male ferrule also has an externally threaded male connection portion juxtaposed external to the first tubular member. The connection portion of the male ferrule is substantially parallel with an axial centerline of the first tubular member and has a lip which projects therefrom.

Additionally, the female hose subassembly provides a second tubular member having a second outer casing externally surrounding a distal end thereof with a female ferrule partially projecting internally therein concentric and congruent with the second outer casing. Thus, the second tubular member is trapped between the second outer casing and the female ferrule. The female ferrule is defined by an insertion segment projecting within the second tubular member and a flanged segment radially projecting outward therefrom juxtaposed adjacent to the distal end of the second tubular member. Furthermore, the female ferrule has a substantially cylindrical extension segment projecting from a circumferential edge of the radially flanged segment such that the extension segment is substantially parallel with an axial centerline of the female hose subassembly. The extension segment acts as an additional seal distortion limiting wall. Moreover, the female ferrule also has an inwardly angled segment projecting from an end of the extension segment opposite from the radially flanged segment. An internally threaded nut is rotatably mounted around the female hose subassembly and provides a secure connection with the mating connection portion of the male hose subassembly. Simultaneously, the seal is concentrically mounted within the female hose subassembly against the radially flanged segment and the extension segment of the female ferrule with the lip of the male ferrule compressing against the seal when the female and male hose subassemblies are connected together. In an alternate embodiment of the present invention, the male ferrule has an inner cylindrically-shaped shoulder portion extending from the lip thereof. The present invention hose assembly can be used in combination with water carrying garden hoses, pneumatic hoses, negatively pressured vacuum hoses or other fluid carrying conduits.

An advantage of the present invention is that the specific configuration of the female ferrule provides for dynamic sealing. Thus, both flat washer-type seals and the more desirable O-ring type seals can be used. Unlike traditional compression sealing, the present invention serves to contain and trap the seal by using at least three adjacent wall structures. Accordingly, since the seal distortion is limited by these non-movable walls, the hose assembly forces that would normally result in distortion of the seal are counteracted and only result in more effective sealing pressure. In other words, unlike the traditional compression seal commonly used, the present invention dynamic seal allows for more effective fluid sealing as continuing connection pressure is applied against the seal. Moreover, the dynamic seal of the present invention is less prone to taking a permanent set as compared to conventional hose assemblies.

Additional advantages and features of the present invention will become apparent from the following description and appended claims, taken in conjunction with the accompanying drawings.

BRIEF DESCRIPTION OF THE DRAWINGS

FIG. 1 is an exploded perspective view, partially in section, showing preferred embodiment of a hose assembly of the present invention in combination with an O-ring type seal;

FIG. 2 is a sectional view, taken along the axial direction, showing the present invention hose assembly of FIG. 1;

FIG 3 is a sectional view, taken along the axial direction, showing a female ferrule of the present invention hose assembly of FIG. 1;

FIG. 4 is a sectional view, taken along the axial direction, showing the present invention hose assembly of FIG. 1 in combination with a washer-type seal; and FIG. 5 is a sectional view, taken along the axial direction, showing an alternate embodiment of the present invention hose assembly.

DETAILED DESCRIPTION OF THE PREFERRED EMBODIMENT

Referring to FIGS. 1 and 2, the preferred embodiment of a hose assembly 10 of the present invention is comprised of a male hose subassembly 12, a seal 14 and a female hose subassembly 16. When male hose subassembly 12 and female hose subassembly 16 are connected together with seal 14 mounted therebetween, hose assembly 10 is operable as a conduit for flowing fluids or a vacuum generated negative pressure internally therethrough. In the preferred exemplary embodiment, hose assembly 10 is a garden hose for carrying water.

Male hose subassembly 12 has a first tubular member 18, a first outer casing 20 and a male ferrule 22. First tubular member 18 is a flexible elastomeric hose of cylindrical shape having an outer surface 24, a concentric inner surface 26 and a distal end 28. First outer casing 20 has a cylindrically-shaped body 30 bordered by an inwardly turned shelf 32 and a flanged waist 34. Body 30 of first outer casing 20 snugly surrounds outer surface 24 of first tubular member 18 and shelf 32 is proximate with distal end 28.

Male ferrule 22 is defined by an insertion portion 40, an outwardly flanged portion 42° a connection portion 44 and a lip 46. Insertion portion 40 is cylindrical in shape interrupted by a plurality of radially corrugated projections 48. Insertion portion 40 is located within first tubular member 18 adjacent to inner surface 26 thereof. Furthermore, insertion portion 40 is concentric and congruent with first outer casing 20 such that the adjacent portion of first tubular member 18 is firmly trapped therebetween. Accordingly, outwardly flanged portion 42 of male ferrule 22 is proximate with distal end 28 of first tubular member 18 and shelf 32 of first outer casing 20. Also, connection portion 44 of male ferrule 22 is substantially cylindrical in shape being parallel to an axial centerline 50 and has external threads 52 therearound. Connection portion 44 is external to first tubular member 18. Moreover, lip 46 is inwardly turned toward axial centerline 50 and extends from a corner 54 of connection portion 44. Lip 46 also has a radial edge 56 which creates an aperture 58 therethrough.

Female hose subassembly 16 is constructed from a second tubular member 70, a second outer casing 72 and a female ferrule 74. Additionally, female hose subassembly 16 has a nut 76. As with male hose subassembly 12, second tubular member 70 similarly has a cylindrical outer surface 77, a concentric inner surface 78 and a distal end 80. Also, second outer casing 72 has a cylindrically-shaped body 82 bordered by an inwardly turned shelf 84 and a flanged waist 86. Shelf 84 is proximate with distal end 80 of second tubular member 70.

As can best be seen in FIGS. 2 and 3, female ferrule 74 is defined by an insertion segment 90, a radially flanged segment 92, an extension segment 94 and an inwardly angled segment 96. Insertion segment 90 is juxtapositioned within second tubular member 70 concentric with inner surface 78 thereof. Furthermore, insertion segment 90 of female ferrule 74 is concentric and congruent with second outer casing 72 such that second tubular member 70 is firmly trapped therebetween. Accordingly, radially flanged segment 92 extends outward from insertion portion 90 and is proximate with distal end 80 of second tubular member 70 and shelf 84 of second outer casing 72. Extension segment 94 is cylindrical in shape and is substantially parallel with axial centerline 50. Extension segment 94 axially projects from a circumferential edge 98 of radially flanged segment 92. Moreover, inwardly angled segment 96 protrudes from an end 100 of extension segment 94 and has an edge 102 which is angled toward axial centerline 50. Edge 102 defines an orifice 104 therethrough.

Nut 76 has a cylindrical housing 108 with a plurality of internal threads 110 which are operably engagable with external threads 52 of male ferrule 22. Nut 76 also has a sill 112 which radially extends inward from housing 108 for rotational mounting adjacent to radially flanged segment 92 of ferrule 74. Nut 76 can be made from any suitable polymeric or elastomeric material.

Returning to FIGS. 1 and 2, seal 14 has an annular configuration and a circular cross sectional shape thereto. Such a seal 14 is commonly known as an O-ring. Seal 14 is preferably made from a rubber material and is concentrically mounted within female hose subassembly 16 against radially flanged segment 92 and extension segment 94 of female ferrule 74. Seal 14 is further held by inwardly angled segment 96. Accordingly, when female and male hose subassemblies 16 and 12, respectively, are connected together, lip 46 of male ferrule 22 compresses against seal 14. Since seal 14 is trapped by at least three non-movable walls such as radially flanged segment 92, extension segment 94 and lip 46, the hose assembly 10 of the present invention provides for dynamic sealing. In other words, seal 14 is substantially prevented from significant deformation under load. Therefore, the greater the connection pressure applied against seal 14, the better the seal.

Additionally, edge 102 of inwardly angled segment 96 also serves to limit the compressive forces applied against seal 14 during connection of female and male hose subassemblies 16 and 12, respectively. Edge 102 is designed to abut against a portion 114 when the desired compression of seal 14 is achieved. This serves to prevent over-torquing of nut 76.

Moreover, as is illustrated in FIG. 4, a conventional washer-style seal 120 can also be used with the aforementioned female and male ferrules, respectively 74 and 22. Such a washer-style seal 120 is defined by a substantially flat annular shape having a pair of side walls 122 and 124 bordered by a pair of faces 126 and 128. Seal 120 is commonly made from an elastomeric material as would be known to one skilled in the art. Accordingly, the present invention hose assembly 10 allows for more effective sealing by limiting the distortion and turning a typical compression seal 120 into a dynamic acting seal.

Referring to FIG. 5, an alternate embodiment of male ferrule 22 is shown. In this embodiment, male ferrule 22 has an inner cylindrically-shaped shoulder portion 140 projecting from edge 56 of lip 46. Shoulder portion 140 is substantially parallel with axial centerline 50 and acts as a fourth wall in trapping seal 14 thereagainst. Shoulder portion 140 further has a distal end 142 which also serves as a compression limiter by abutting against radially flanged segment 92 of female ferrule 74. Thus, an enhanced dynamic seal is provided for use in carrying high pressure fluid or a negatively pressured vacuum.

While the preferred embodiment of this hose assembly having a distortion limiting wall has been disclosed, various modifications may be made without departing from the present invention. For example, the tubular members may be substantially rigid in construction. Moreover, the lip at the end of the male ferrule may be only slightly turned in toward the axial centerline or may merely extend in an axial direction from the connection portion without any turn at all. Also, the specific configuration of the outer casings may be different. While various materials have been disclosed in an exemplary fashion, a variety of other materials may of course be employed. It is intended by the following claims to cover these and any other departures from the disclosed embodiments which fall within the true spirit of this invention.

The invention claimed is:

1. A hose assembly comprising:

an annular seal;

a male hose subassembly further comprising a first tubular member with a first outer casing externally surrounding a distal end thereof and having an insertion portion of a male ferrule protruding partially therein concentric and congruent with said first outer casing, said first tubular member being securely trapped between said insertion portion of said male ferrule and said first outer casing therearound, said male ferrule also having an externally threaded male connection portion attached therewith juxtaposed external to said first tubular member and being substantially parallel with an axial centerline thereof, said connection portion of said male connector having a lip projecting therefrom; and a female hose subassembly comprising a second tubular member having a second outer casing externally surrounding a distal end thereof and having a female ferrule partially projecting internally therein concentric and congruent with said second outer casing, said female ferrule having an insertion segment projecting within said second tubular member and having a flanged segment radially projecting outward therefrom adjacent to said distal end of said second tubular member, said female ferrule further having a substantially cylindrical extension segment projecting from a circumferential edge of said radially flanged segment such that said extension segment is substantially parallel with an axial centerline of said female hose subassembly and acts as a distortion limiter for said seal, said female ferrule also having an inwardly angled segment projecting from an end of said extension segment thereof opposite from said flanged segment thereof, said female hose subassembly having an internally threaded nut rotatably mounted therearound for providing a secure connection with said connection portion of said male hose subassembly, said seal being concentrically juxtapositioned within said female hose subassembly against said flanged segment and said extension segment of said female ferrule with said lip of said male ferrule compressing against said seal when said female and male hose subassemblies are connected together.

2. The hose assembly of claim 1 wherein:

said lip is inwardly turned from said connection portion of said male ferrule.

3. The hose assembly of claim 2 further comprising:

an inner cylindrically-shaped shoulder portion extends in said axial direction from an innermost edge of said lip of said male ferrule, said seal being substantially trapped between said shoulder portion and said lip of said male ferrule and said radially flanged segment and said extension segment of said female ferrule when said male and said female hose assemblies are connected to one another.

4. The hose assembly of claim 3 further comprising:

a distal end of said shoulder portion of said male ferrule abuts against said radially flanged segment of said female ferrule to prevent over compression of said seal therebetween.

5. The hose assembly of claim 3 wherein:

said male hose assembly, said female hose assembly and said seal therebetween are configured to seal against internal vacuum generated negative pressures thereagainst.

6. The hose assembly of claim 1 wherein:

said first and said second tubular members are substantially flexible hoses.

7. The hose assembly of claim 6 wherein:

said female and said male hose assemblies are configured as garden hoses for carrying water internally therethrough.

8. The hose assembly of claim 1 wherein:

said seal has an annular O-ring type configuration with a substantially circular cross sectional shape thereto.

9. The hose assembly of claim 1 wherein:

said seal is configured as an annular and substantially flat washer-style seal.

10. The hose assembly of claim 1 wherein:

the compression of said lip of said male ferrule against said seal is axially limited by an interference created between said inwardly angled segment of said female ferrule against a predetermined portion of said male ferrule.

11. A garden hose assembly for flowing water therethrough comprising:

an annular seal having an annular O-ring type configuration with a substantially circular cross sectional shape thereto;

a male hose subassembly further comprising a substantially flexible first tubular member with a first outer casing externally surrounding a distal end thereof and having an insertion portion of a male ferrule protruding partially therein concentric and congruent with said first outer casing, said first tubular member being securely trapped between said insertion portion of said male ferrule and said first outer casing therearound, said male ferrule also having an externally threaded male connection portion attached therewith juxtaposed external to said first tubular member and being substantially parallel with an axial centerline thereof, said connection portion of said male connector having an inwardly turned lip radially projecting therefrom;

a female hose subassembly comprising a substantially flexible second tubular member having a second outer casing externally surrounding a distal end thereof and having a female ferrule partially projecting internally therein concentric and congruent with said second outer casing, said female ferrule having an insertion segment projecting within said second tubular member and having a flanged segment radially projecting outward therefrom adjacent to said distal end of said second tubular member, said female ferrule further having a substantially cylindrical extension segment projecting from a circumferential edge of said radially flanged segment such that said extension segment is substantially parallel with an axial centerline of said female hose subassembly and acts as a distortion limiter for said seal, said female ferrule also having an inwardly angled segment projecting from an end of said extension segment thereof opposite from said flanged segment thereof, said female hose subassembly having an internally threaded nut rotatably mounted therearound for providing a secure connection with said connection portion of said male hose subassembly, said seal being concentrically juxtapositioned within said female hose subassembly against said flanged segment and said extension segment of said female ferrule with said lip of said male ferrule compressing against said seal when said female and male hose subassemblies are connected together; and the compression of said lip of said male ferrule against said seal being axially limited by an interference created between said inwardly angled segment of said female ferrule against a predetermined portion of said connector portion of said male ferrule.

* * * * *